United States Patent [19]
Brooks et al.

[11] Patent Number: 5,815,261
[45] Date of Patent: Sep. 29, 1998

[54] CORRELATION SPECTROMETER WITH HIGH-RESOLUTION, BROAD-BAND OPTICAL CHARACTERISTICS

[75] Inventors: Neil H. Brooks, San Diego, Calif.; Sergey N. Tugarinov, Troitsk; Nicolae N. Naumenko, Minsk, both of Russian Federation; Torkil H. Jensen, Del Mar, Calif.

[73] Assignee: General Atomics, San Diego, Calif.

[21] Appl. No.: 838,298

[22] Filed: Apr. 16, 1997

[51] Int. Cl.[6] ................................ G01J 3/04; G01J 3/20
[52] U.S. Cl. ............................. 356/310; 356/328
[58] Field of Search .................... 356/310, 326, 356/328, 329, 330

[56] References Cited

U.S. PATENT DOCUMENTS

| | | | |
|---|---|---|---|
| Re. 28,216 | 10/1974 | Barringer et al. | 356/310 |
| 3,314,327 | 4/1967 | Killpatrick et al. | 88/14 |
| 3,594,083 | 7/1971 | Barringer | 356/308 |
| 3,694,086 | 9/1972 | May | 356/51 |
| 3,700,332 | 10/1972 | Decker, Jr. | 356/97 |
| 3,744,918 | 7/1973 | Jacobsson | 356/188 |
| 3,955,891 | 5/1976 | Knight et al. | 356/74 |
| 4,746,793 | 5/1988 | Hopkins, II | 250/237 R |
| 4,790,656 | 12/1988 | Tsukishima | 356/349 |
| 4,895,445 | 1/1990 | Granger | 356/328 |
| 5,066,127 | 11/1991 | Schwenker | 356/328 |
| 5,090,807 | 2/1992 | Tai | 356/310 |
| 5,434,666 | 7/1995 | Carnahan et al. | 356/328 |
| 5,489,980 | 2/1996 | Anthony | 356/328 |
| 5,504,575 | 4/1996 | Stafford | 356/330 |

OTHER PUBLICATIONS

Kamiya, et al., "A Multislit, Concave Grating Spectrometer", *Optics Communications*, vol. 16, 182–185 (1976).

Koike, et al., "Golay–Type Static Multi–Slit Spectrometer", *Optica Acta*, vol. 24, No. 11, 1147–1161 (1977).

*Primary Examiner*—Frank G. Font
*Assistant Examiner*—Zandra V. Smith
*Attorney, Agent, or Firm*—Fitch, Even, Tabin & Flannery

[57] ABSTRACT

A spectrometer that determines a spectral correlation between an optical signal and a reference spectra over a broad spectral range while maintaining a relatively high resolution. The spectrometer uses a mask that has high resolution slits at wavelengths corresponding to the reference spectra. Relative oscillatory movement is induced between the mask and the imaged spectra of the optical signal is induced and the light passing through the slits is collected by an optical sensor. A lock-in amplifier monitors a signal from the optical sensor as well as a signal representative of the oscillatory movement and determines a correlation between them.

7 Claims, 4 Drawing Sheets

CORRELATION SPECTROMETER WITH HIGH-RESOLUTION, BROAD-BAND OPTICAL CHARACTERISTICS

BACKGROUND OF THE INVENTION

The present invention relates to optical spectroscopy, and more particularly, to a spectrometer that performs spectroscopic analysis over a broad wavelength range with high resolution.

A typical high resolution spectrometer resolves incoming light into a large number of finely resolved wavelength bands or spectral lines. The spectrometer's spectral coverage is generally determined by the size of the spectrometer's detector, and for a given detector size, the spectrometer's resolution is generally determined by the detector's element or pixel width for a given detector size. For a high resolution spectrometer, the detector's size is often the limiting factor on the spectrometer's spectral coverage. Furthermore, detectors having large arrays of densely packed elements or pixels necessarily generate large volumes of data and require significant computational resources to process this volume of data.

Spectroscopic detection of a particular chemical substance in a mixture of substances often involves discerning several relatively faint spectral lines, characteristic of the particular chemical substance, in the presence of nearby higher intensity spectral lines associated with the other substances of the mixture. Further, the particular substance's characteristic spectra may be distributed over a very large spectral range. For example, the Balmer series spectra has significant spectral lines over the range of about 380 nanometers to about 650 nanometers. To detect the complete Balmer series would require sampling of many narrow wavelength bands over a broad spectral range resulting in the generation of a relatively large volume of data. Accordingly, intensive computational resources are often required to process and store the data generally associated with performing high-resolution chemical substance detection over a broad spectra range.

Accordingly, there exists a need for a high-resolution, broad-band spectrometer that uses relatively low-cost detectors and avoids the use of relatively large computational resources. The present invention satisfies these needs.

SUMMARY OF THE INVENTION

The present invention is embodied in a correlation spectrometer for detecting the presence of a particular chemical substance. The correlation spectrometer is particularly advantageous for detecting the presence and quantity of a trace impurity in a mixture. The spectrometer includes an optical instrument, a mask, a driver, and an electro-optical sensor. The detection of the trace substance is based on a comparison between an optical signal's spectra and a reference spectra encoded by the mask. The mask is configured to avoid the need for intensive computational resources for detecting the trace impurity.

The optical instrument spectrally disperses the optical signal in a dispersion direction that lies substantially in a dispersion plane and images the signal's spectral components onto an image region oriented perpendicular to the dispersion plane. Accordingly, the optical signal's spectral components are resolved along the dispersion direction. The mask is located in the image region and has a plurality of transmissive slits. The slits are located along dispersion direction at locations that encode the reference spectra. The driver induces relative movement in the dispersion direction of the image region between the mask and the optical signal's imaged spectral components. The electro-optical sensor is responsive to light from the optical signal's spectral components passing through the transmissive slits and provides an electrical signal that represents the intensity of light passing through the transmissive slits.

In more detailed features of the invention, the image region may be circularly curved and the optical signal's spectral components are imaged along an arc of the curved image region that corresponds to the dispersion direction. Also, the mask may have a height between about 0.65 and 10 millimeters perpendicular to the arc and a length of about 140 millimeters along the arc. The driver may include a torsion column, an electro-mechanical vibrator, and a platform mounted on the torsion column. The mask is mounted on the platform and the electro-mechanical vibrator is attached to the platform for oscillating the mask with respect to the imaged spectral components. The platform may further include an inertia ring that largely defines the resonant frequency of the platform and torsion column and the electro-mechanical vibrator would vibrate at the resonant frequency. Also, the slits may have a width of about 20 microns and the oscillations of the platform would move the mask with respect to the imaged spectral components over a distance between 20 and 120 microns in the dispersion direction.

In other more detailed features of the invention, the driver includes a glass plate located within the optical instrument in a path of the optical signal. The glass plate is oscillated such that oscillations in the plate's angle with respect to the optical signal's path oscillates the imaged spectral components, along the dispersion direction, with respect to the mask.

The present invention is alternatively embodied in a method for determining the presence of a selected substance in a mixture of substances. The mixture of substances is caused to emit light that includes, if any of the selected substance is present, a characteristic spectral signal that is associated only with the selected substance. The emitted light is resolved along a dispersion direction and light at discrete spectral lines along the dispersion direction is collected. The discrete spectral lines have a spectral width of about 0.05–0.10 nanometers and correspond to the characteristic spectral signal of the selected substance. The collected light is processed to determine the presence of the selected substance. The collected light further may be processed to determine a relative quantity of the selected substance.

BRIEF DESCRIPTION OF THE DRAWINGS

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
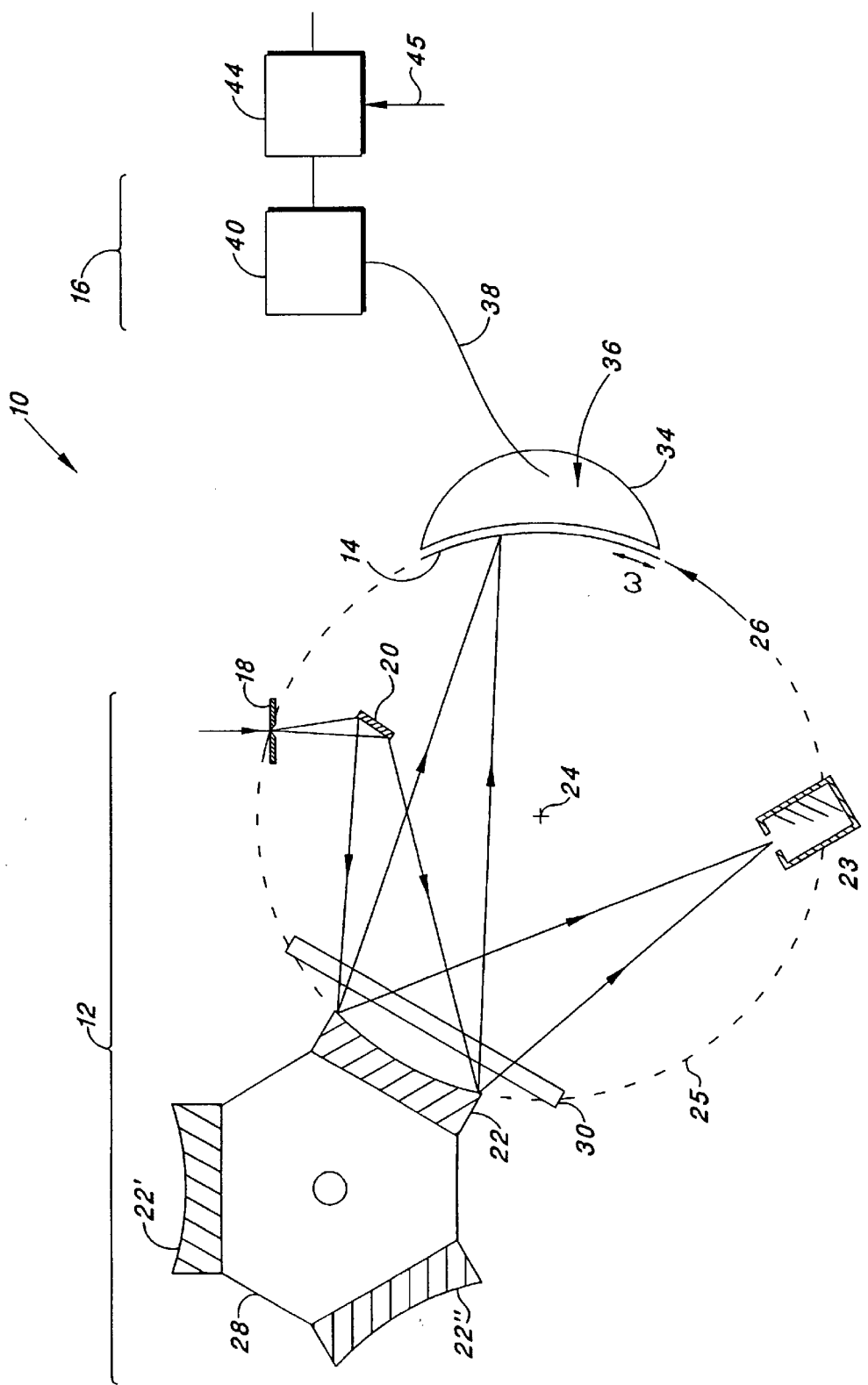
FIG. 1 is a top view of a spectrometer that includes a mask encoded with a reference spectra, in accordance with the present invention.

As shown in the exemplary drawings, and particularly in FIG. 1, the present invention is embodied in a high-resolution spectrometer 10 and related method, that provides an electrical signal representing, over a broad spectral range, the similarity between a reference spectra and the spectra of an optical signal from a light source.

In a first embodiment of the invention, the optical instrument 12 is based on a survey spectrograph which uses a Rowland circle design to provide a high optical throughput and a significant improvement in optical performance over a flat-field spectrometer. The spectrometer includes an optical instrument 12, a spectral mask 14, and an integrating electro-optical sensor 16. Light enters the optical instrument through an entrance slit 18 and is deflected by a planar mirror 20 toward a concave diffraction grating 22. The slit's width is adjustable from 10 microns to 1 millimeter. The slit's vertical height is 10 millimeters. Scattered light inside the instrument is minimized using a light trap 23 which captures zero-order reflections from the grating.

The grating 22 is an aberration-corrected holographic diffraction grating having a concave reflective surface with a curvature radius of 25 centimeters and a full aperture diameter of 7 centimeters. The grating is oriented along the perimeter of a circle 25 (shown in FIG. 1 with a dashed line) having a center point 24 and a diameter of 12.7 centimeters. The grating resolves the incoming light into its spectral components by angularly diffracting the light, by wavelength, in a dispersion plane. The aberration corrected holographic grating, configured for use with the Rowland circle optical mount, yields, in a curved image plane 26 along the circle's perimeter, the special properties of stigmatic imaging and high resolution with large aperture.

Several grating densities are readily available using a turret 28 having several gratings of differing grating densities mounted on it. Preferably, the density of a first grating 22 is 1200 gratings per millimeter (g/mm), a second grating 22' is 1800 g/mm, and a third grating 22" is 2400 g/mm. While gratings with densities generally associated with imagining visible light are enumerated, the grating's density may be selected to allow for imaging infrared portions of the spectra. Accordingly, the ruling density of the grating can be changed merely by rotating the turret until the desired grating is in the correct position.

The grating's aperture may be masked, as required, in the vertical direction using horizontal mask 30 to improve the instrument's vertical resolution. (The horizontal direction lies in the plane of the Rowland circle and the vertical direction lies perpendicular to the plane of the Rowland circle.) An achievable vertical resolution using, for example, a grating aperture of 40 millimeters in the vertical direction is 0.1 millimeters. The resulting optical instrument is stigmatic, has an f/number of 3 (without the mask 30), and provides a spectral resolution of about 0.05–0.1 nanometers.

The spectral mask 14 lies along the curved image plane 26 of the Rowland circle 25 and therefore takes advantage of the spectrograph's high-resolution stigmatic imaging properties. To cover a first order spectral range between about 400 nanometers and about 900 nanometers, the mask has a length of about 140 millimeters and has a height between about 0.65 millimeters and about 10 millimeters.

Figure 2:
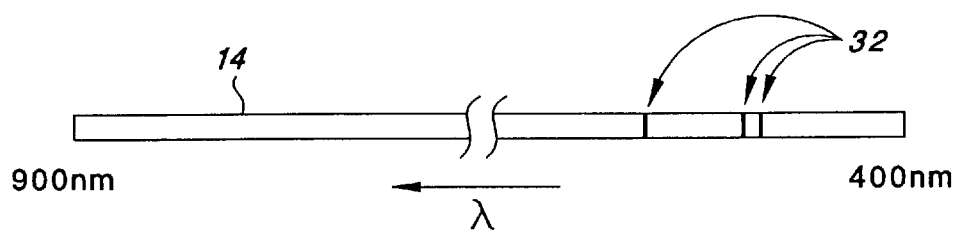
FIG. 2 is an side elevation view of the mask of FIG. 1.

As shown in FIG. 2, the spectral mask 14 has a varying transmission pattern that corresponds to a reference spectra. Typically, the transmission pattern is a series of transparent areas or slits 32 having a width corresponding to the spectrometer's spectral resolution. Preferably, the mask is photographic film with the slits produced by placing unexposed film along the curved image plane 26 and exposing it with the desired emission spectra, for example, the spectra from a trace impurity. The mask accordingly would have a pattern produced by the trace impurity that has a spectral resolution which is limited only by the spectrograph's or the film's resolution. Note that for simplicity of illustration, the mask shown in FIG. 2 is a "negative" of a mask that is used in the present invention. Accordingly, the slits would be transparent and the remaining areas of the mask would be black or otherwise nontransparent.

The integrating electro-optical sensor 16 (FIG. 1) includes a hemisphere 34 coated with a diffusively reflective material such as magnesium oxide ($MgO_2$). Nontransmissive portions of the mask 14 are likewise coated with a reflective coating such as aluminum. The combination of the hemisphere and the coated mask form a chamber 36 having the properties of a light integrating sphere. An optical fiber 38 or fiber bundle transmits light from the integrating chamber to a spot detector 40 which generates an electrical signal proportional to the intensity of light within the chamber. The spot detector is a relatively low-cost silicon detector or the like having the size of it's active area selected for optimum noise performance.

Figure 3:
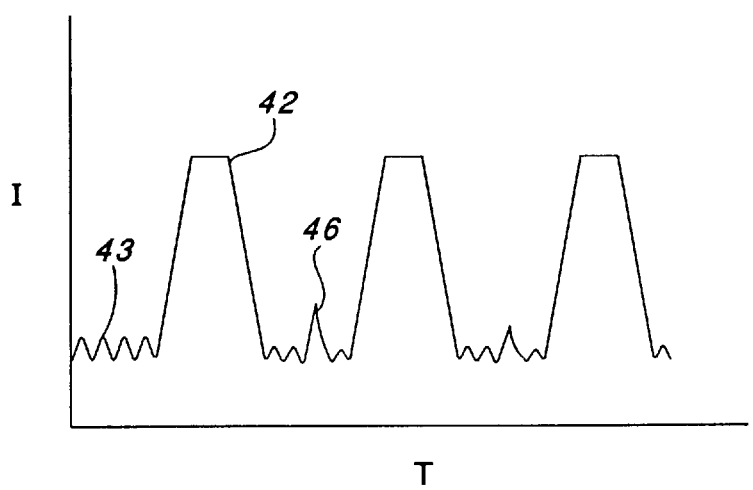
FIG. 3 is a graph of the optical intensity, versus time, of light from spectral lines that passes through transparent parts or slits in the mask of FIG. 2.

The optical signal that is imaged by the spectrograph 10 includes the contribution of both the spectra from the trace impurity and the spectra from any other chemical substances in the mixture. The optical mask 14, which has transmissive slits 32 associated with an impurity's spectra, is used to determine the impurity's presence by performing a spectral correlation between the optical signal's spectra and the reference spectra recorded by the slits. The correlation is performed by inducing relative oscillatory movement in the dispersion direction between the optical signal's spectral image and the mask. The oscillatory movement between the spectral image and the mask causes the intensity of light within the integrating chamber 36 to oscillate as the transmissive slits are alternatively aligned and misaligned with the impurity's spectra, if present, as shown in FIG. 3. Thus, as the transmissive slits of the oscillating mask are aligned with the spectra of an impurity, the light passing through the plurality of slits is integrated by the chamber resulting in a relatively high light intensity signal 42 or a peak and as the slits are misaligned with the spectra of the impurity, the resulting integrated light has a relatively low light intensity 43. The time between peaks is equal to one-half of an oscillation cycle. Accordingly, the detector generates an electrical signal that oscillates in accordance with the oscillating light intensity within the chamber.

A lock-in amplifier 44 (FIG. 1), having a sync signal input 45 associated with the mask's oscillations, monitors the detector's signal and generates a weighted difference signal. More specifically, the lock-in amplifier processes the signal generated by the light passing through the slits in accordance with the following equation:

$$S(t) = \frac{1}{T} \int_{t-T}^{t} F(t')s(t')dt' \tag{1}$$

where the period of the form function F is the reciprocal of the frequency of the relative oscillation between the mask 14 and the spectral image, and the integration limits encompass a time period T which is long compared with the period, i.e., many oscillations. Desirably, the time period T is several hundred or thousand times larger than the oscillator time period. Such processing (in accordance with equation 1) improves the signal-to-noise ratio and thereby significantly improves the sensitivity of the apparatus 10.

Of course, the slits, during the misaligned portion of the oscillation, may overlap with strong spectral lines emitted by the other substances, thus generating an interference signal 46 or peak. The effect of these interfering signals may be lessened by using an oscillation amplitude that is several times larger than the width of the transmission slits. Results from the weighted difference signal therefore are only reliable when the oscillation amplitude is larger than the instrumental line width or the inherent line width of the light source. However, too large of an oscillation amplitude unnecessarily reduces the amplitude of the aligned portion of the signal. Setting the oscillation amplitude to between two and five times the slit widths provides a good balance between signal interference and correlation signal contribution.

Using a Rowland circle spectrometer 10, preferably the mask 14 is oscillated while the spectrometer and imaged spectra remain stationary. Advantageously, the mask may be oscillated about the central axis 24 of the Rowland circle 25 using a torsion column assembly in conjunction with an audio frequency driver 48 such as a speaker coil or a piezoelectric crystal.

The torsion column assembly has a platform 46 mounted on a torsion column 47. The column is formed of six fins 49 that are placed in a radial configuration. The fins are formed of 3/16 inch thick stainless steel plates. The torsion column assembly includes an aluminum ring 50 that is attached to the platform and that provides a strong mounting surface having a relatively high rotational inertia. The outer ring's moment of inertia is significantly larger than the moment of inertia of the torsion column or the platform and largely defines the resonant frequency of the torsion column and platform. The mask 14 is attached to one edge of the platform by a mask support 52. The speaker coil 48 is attached to the platform at a location 54 that is opposite the mask support. Also mounted on the platform opposite the mask support is a counterweight to balance the mask's weight. The speaker coil is driven by an audio frequency signal at the resonant frequency of the torsion column assembly (640 Hz). The audio frequency signal is also applied to the sync signal input 45 (FIG. 1) of the lock-in amplifier 44 for synchronizing the amplifier to the mask oscillations. Alternatively, a piezoelectric crystal or the like may be used to drive the torsion tower's oscillations.

Empirical measurements using an audio speaker have shown that mask oscillations as great as 250 microns may be achieved with 25 watts of audio power. Since the spectral resolution of film in the spectrometer is less than or equal to about 20 microns, oscillating the mask 14 at fives times the mask's slit line width, i.e., 100 microns, is readily achievable.

Figure 5:
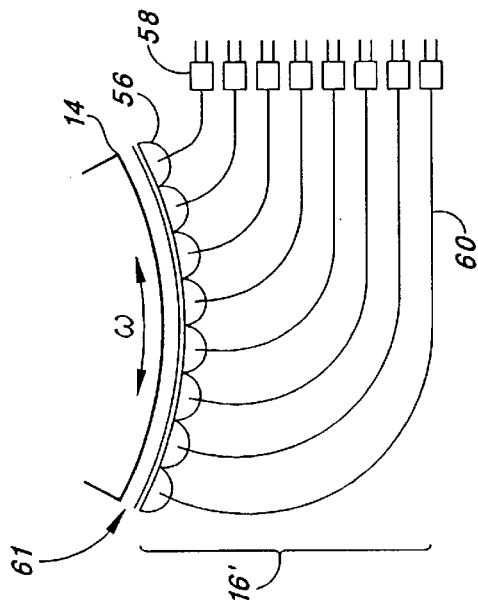
FIG. 5 is a partial top plan view of an alternative embodiment of a spectrometer of the present invention, having a segmented integrating sensors.
Figure 4:
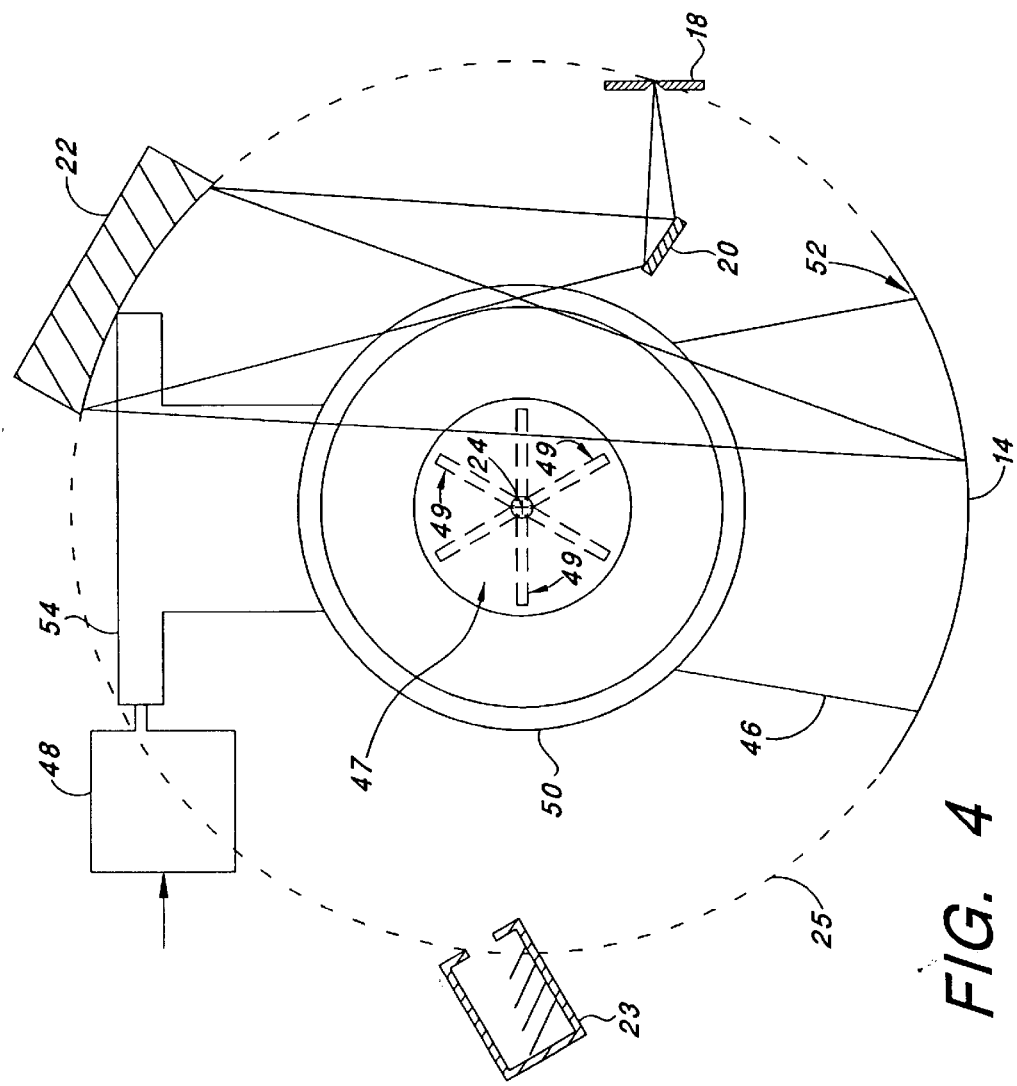
FIG. 4 is a top plan view of a torsion column and platform for supporting and moving the mask of FIG. 2.

Alternatively, as shown in FIG. 5, the integrating sensor 16' may include an array of integrating spheres 56, each coupled to a corresponding spot detector 58 by an optical fiber 60. Between the integrating spheres and the mask 14 is an array of liquid-crystal light valves 61 placed between the mask 14 and aligned with a corresponding integrating sphere. Although an array of eight segments is shown, the number of segments may be increased or decreased. The transmissivity of each light valve may be varied in order to enhance the relative contribution of selected spectral lines to the detector signal. Accordingly, the relative contribution of an impurity's relatively weak spectral lines may be improved. The relative weighting function for the desired element is selected and encoded by varying the light valves transmissivity. A correlation is measure for each segment and normalized, thus generating a correlation probability for each segment. The probabilities for each segment are multiplied together to generate an overall correlation probability. This allows for an overall improvement in the sensitivity of the apparatus.

Figure 6:
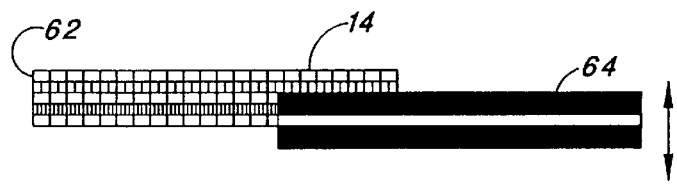
FIG. 6 is an elevation view of a mask having multiple spectral patterns.

Because the spectrometer 10 is stigmatic over the full 10 millimeter height of the entrance slit, the height of the mask 14 may be made as great as 10 millimeters (with 1:1 magnification). As shown in FIG. 6, the mask can be separated in the vertical direction into horizontal strips 62. Each strip has a spectral pattern that is associated with a particular impurity. To test for the existence of several impurities, a vertical occulter 64 is situated in front of the mask so that one horizontal strip is illuminated at a time. (The vertical occulter is shown in FIG. 6 as offset to one side of the mask only to allow for illustration of the mask. The occulter normally would be aligned with and extend over the full length of the mask.) If an impurity corresponding to the spectra of the illuminated horizontal strip is present, a correlation is indicated by the correlation signal. By stepping the occulter through the horizontal strips, several impurities may be searched for in relatively rapid succession. The mask would desirably be curved in the vertical direction for good focus across the full height of the input surface.

Figure 7:
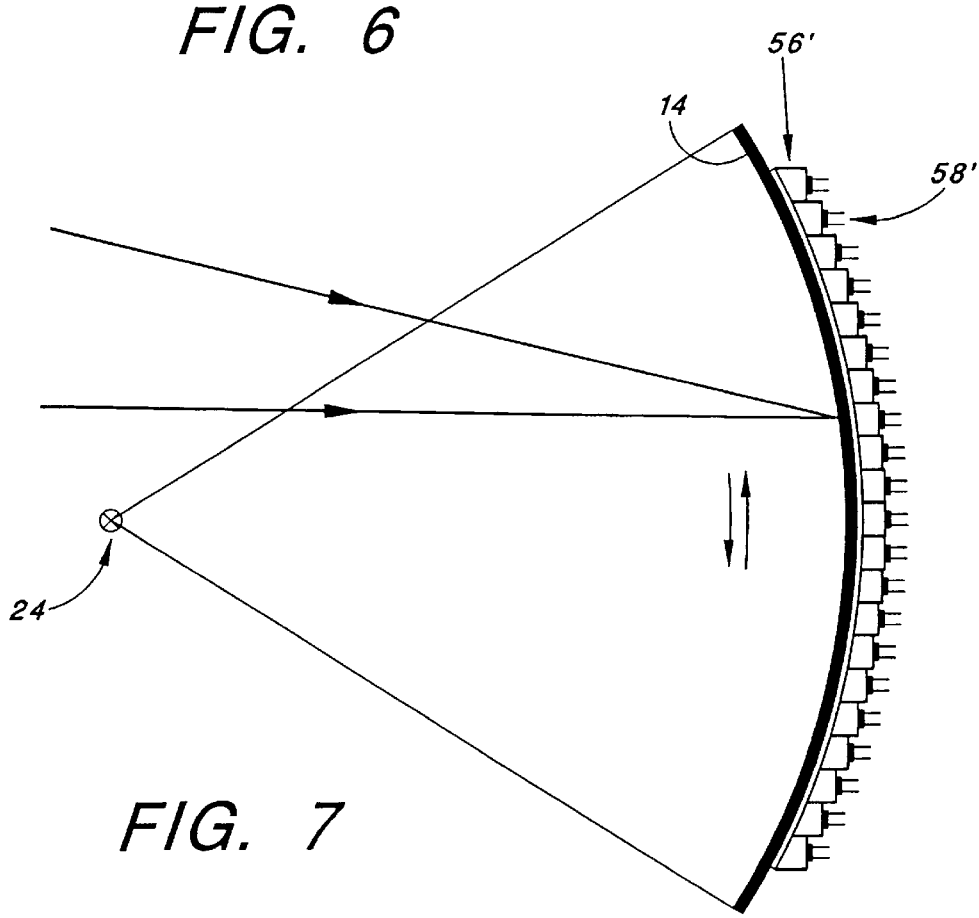
FIG. 7 is a partial top plan view of another alternative embodiment of a spectrometer of the present invention, having segmented integrating sensors with each sensor having an integral detector.

As shown in FIG. 7, the optical fiber between the integrating chambers 56' and the spot detectors 58' may be eliminated. This may be advantageous if a large number of integrating chambers are to be used to collect the correlated light.

Figure 8:
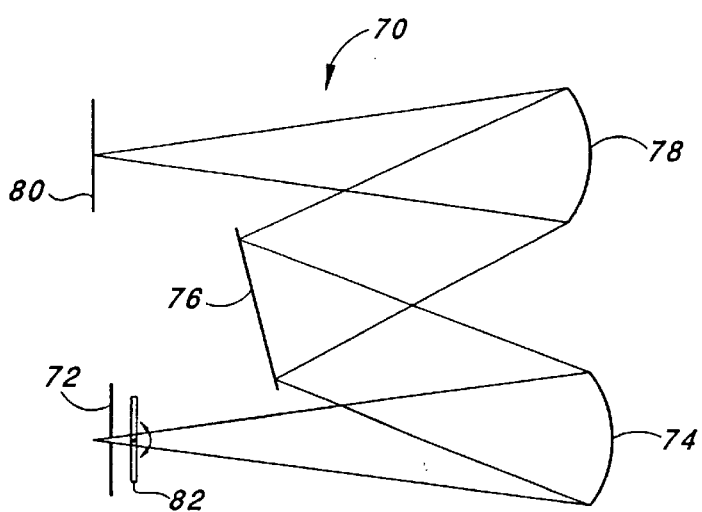
FIG. 8 is a top view of an alternative embodiment of a spectrometer that includes a mask, in accordance with the present invention.

In an alternative embodiment of a spectrometer in accordance with the invention, shown in FIG. 8, the spectral image is oscillated relative to a fixed mask. The spectrometer 70 is based on a Czerny-Turner spectrometer configuration. The spectrometer includes an entrance slit 72, a collimating mirror 74, a flat diffraction grating 76, a focusing mirror 78, and an image plane 80. In this spectrometer configuration, the optical axis is oriented normal to the entrance slit, thus allowing good spectral resolution to be maintained while oscillating the spectral image. Spectral image oscillation may be induced using rotational oscillation of a thin glass or quartz plate 82 placed between the entrance slit and the collimating mirror. As the mirror's angle with respect to the optical axis changes, the glass plate displaces the "virtual" slit, causing the spectral image in the focal plane to shift by an equal displacement (assuming unity magnification between the source plane and the image plane).

Although a Czerny-Turner spectrometer configuration is described in FIG. 8, this approach of the invention readily may be implemented using similar high resolution spectrometers which employ a plane grating for diffracting and concave mirrors for collimating and focusing the light of the optical signal.

Although the invention has been described in terms of detecting the emission spectra of a substance, the invention may be applied to detecting the absorption spectra of a substance. Likewise, the mask's spectral pattern may be encoded using mirrored bands instead of transparent slits.

While the invention herein disclosed has been described by means of specific embodiments and applications thereof, numerous modifications and variations could be made thereto by those skilled in the art without departing from the scope of the invention set forth in the claims.

What is claimed is:

1. Apparatus for providing an electrical signal representing a measurement of the spectral similarity between an optical signal's spectra and a reference spectra, comprising:
   an optical instrument that spectrally disperses the optical signal, in a dispersion direction that lies substantially in a dispersion plane, such that the signal's spectral components are projected and imaged onto an image region oriented perpendicular to the dispersion plane with the optical signal's spectral components resolved along the dispersion direction;
   a mask that is located in the image region and that has a plurality of transmissive slits, wherein the slits are located along the dispersion direction at locations that encode the reference spectra;
   a driver that induces relative movement in the dispersion direction of the image region between the mask and the optical signal's imaged spectral components, wherein the driver comprises a torsion column, an electro-mechanical vibrator, and a platform mounted on the torsion column, wherein the mask is mounted on the platform and the electro-mechanical vibrator is attached to the platform for oscillating the mask with respect to the imaged spectral components; and
   an electro-optical sensor, responsive to light from the optical signal's spectral components passing through the transmissive slits, that provides an electrical signal that represents the intensity of light passing through the transmissive slits.

2. Apparatus for providing a spectral measurement as defined in claim 1, wherein:
   the platform includes an inertia ring that largely defines the resonant frequency of the platform and torsion column; and
   the electro-mechanical vibrator vibrates at the resonant frequency.

3. Apparatus for providing a spectral measurement as defined in claim 2, wherein:
   the slits have a width of about 20 microns; and
   the oscillations of the platform move the mask with respect to the imaged spectral components over a distance between 20 and 120 microns in the dispersion direction.

4. Apparatus for providing a spectral measurement as defined in claim 3, wherein the platform's oscillation move the slit over a distance of 100 microns in the dispersion direction.

5. A spectrometer for providing a spectral correlation of an optical signal, comprising:
   an entrance slit;
   a diffraction grating that spectrally resolves and images the optical signal onto an arc of a circle;
   a mask that has spectral slits corresponding to specific wavelength bands along the arc;
   a torsion column;
   a platform mounted on the torsion column, wherein the mask is mounted on the platform such that the mask lies in the arc of the circle;
   an electro-mechanical vibrator that is attached to the platform and that drives the platform at an audio frequency associated with a resonant frequency associated with the torsion column and platform to induce oscillatory movement between the mask and the spectrally resolved image along the arc; and
   an electro-optical sensor, responsive to the light transmitted through the slits, that provides an electrical signal that represents the intensity of light transmitted through the slits.

6. Apparatus for providing an electrical signal representing a measurement of the spectral similarity between an optical signal's spectra and a reference spectra, comprising:
   an optical instrument that spectrally disperses the optical signal, in a dispersion direction that lies substantially in a dispersion plane, such that the signal's spectral components are projected and imaged onto an image region oriented perpendicular to the dispersion plane with the optical signal's spectral components resolved along the dispersion direction, the image region being circularly curved and the optical signal's spectral components being imaged along an arc of the curved image region corresponding to the dispersion direction;
   a mask that is located in the image region and that has a plurality of transmissive slits, wherein the slits are located along the dispersion direction at locations that encode the reference spectra, the mask having a height of between about 0.65 and 10 millimeters perpendicular to the arc and a length of about 140 millimeters along the arc;
   a driver that induces relative movement in the dispersion direction of the image region between the mask and the optical signal's imaged spectral components; and
   an electro-optical sensor, responsive to light from the optical signal's spectral components passing through the transmissive slits, that provides an electrical signal that represents the intensity of light passing through the transmissive slits.

7. Apparatus for providing a spectral correlation as defined in claim 6, wherein:
   the driver comprises a glass plate located within the optical instrument in a path of the optical signal; and
   oscillations in the angle of the plate with respect to the optical signal's path oscillates the imaged spectral components, along the dispersion direction, with respect to the mask.

* * * * *